United States Patent
Zhou et al.

(10) Patent No.: US 11,589,317 B2
(45) Date of Patent: Feb. 21, 2023

(54) ALLOCATING UPLINK POWER OF USER EQUIPMENT BETWEEN IMPLEMENTATIONS OF MULTIPLE RADIO ACCESS TECHNOLOGIES IN A FIFTH GENERATION (5G) OR OTHER NEXT GENERATION NETWORK

(71) Applicant: AT&T Intellectual Property I, L.P., Atlanta, GA (US)

(72) Inventors: Yu Zhou, Somerset, NJ (US); Rittwik Jana, Montville, NJ (US); Xuan Tuyen Tran, Piscataway, NJ (US); Ezra Elias Haleva, Oakhurst, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 56 days.

(21) Appl. No.: 17/104,689

(22) Filed: Nov. 25, 2020

(65) Prior Publication Data

US 2022/0167277 A1 May 26, 2022

(51) Int. Cl.
| | |
|---|---|
| *H04W 28/18* | (2009.01) |
| *H04W 52/14* | (2009.01) |
| *H04L 5/00* | (2006.01) |
| *H04W 52/24* | (2009.01) |

(52) U.S. Cl.
CPC ......... *H04W 52/146* (2013.01); *H04L 5/0094* (2013.01); *H04W 52/241* (2013.01)

(58) Field of Classification Search
CPC ..... H04W 72/04; H04W 76/11; H04W 16/14; H04W 28/08
See application file for complete search history.

(56) References Cited

U.S. PATENT DOCUMENTS

| | | | |
|---|---|---|---|
| 2015/0201383 A1* | 7/2015 | Papasakellariou .. | H04W 52/146 455/562.1 |
| 2020/0220612 A1* | 7/2020 | Thomas ............. | H04B 7/18502 |

OTHER PUBLICATIONS

Gupta, et al., "5G Deployment Options," Retreived from the Internet: Feb. 25, 2021, Copyright: 2020, the entire document, https://www.linkedin.com/pulse/5g-deployment-options-pallab-gupta.

\* cited by examiner

*Primary Examiner* — Tu X Nguyen
(74) *Attorney, Agent, or Firm* — Amin, Turocy & Watson, LLP

(57) ABSTRACT

The technologies described herein are generally directed to modeling radio wave propagation in a fifth generation (5G) network or other next generation networks. For example, a method described herein can include, for a network application, identifying, by a system comprising a processor, a user equipment communicatively coupled to base station equipment via a first network connection implementing a first radio access technology and a second network connection implementing a second radio access technology. The method can further include identifying, by the system, performance characteristics of the first network connection and the second network connection. Further, the method can include, based on the first performance characteristic and the second performance characteristic, facilitating, by the system, allocating, to the user equipment, power for uplink transmission by the first network connection and the second network connection, resulting in an uplink power allocation.

20 Claims, 10 Drawing Sheets

ALLOCATING UPLINK POWER OF USER EQUIPMENT BETWEEN IMPLEMENTATIONS OF MULTIPLE RADIO ACCESS TECHNOLOGIES IN A FIFTH GENERATION (5G) OR OTHER NEXT GENERATION NETWORK

TECHNICAL FIELD

The subject application is related to implementation of fifth generation (5G) wireless communication systems or other next generation wireless communication systems, and, for example, different approaches to allocating transmission power of a user equipment among multiple radio access technologies.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
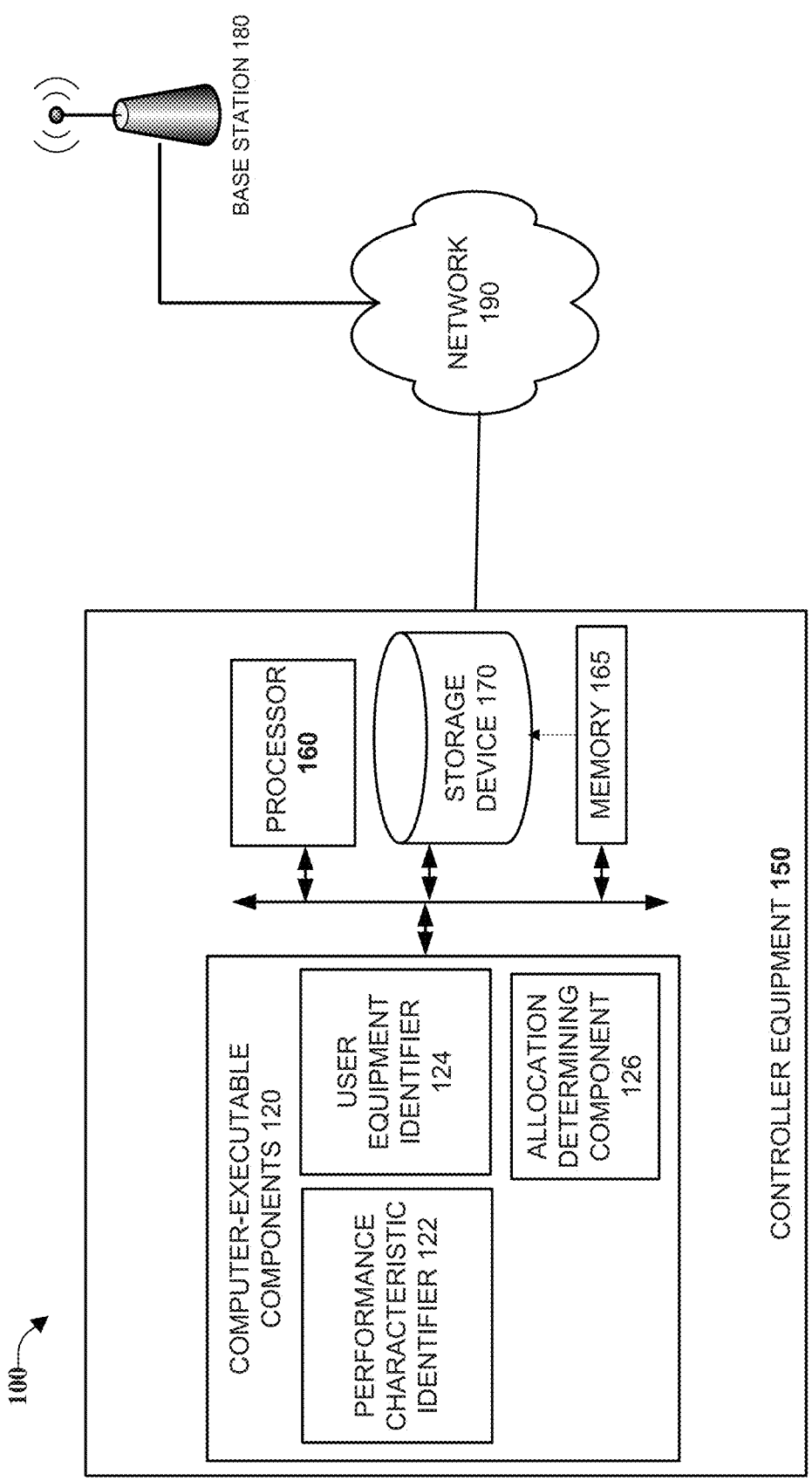
FIG. 1 is an architecture diagram of an example system that can facilitate allocating available uplink power between implementations of two different radio access technologies in a user equipment, in accordance with one or more embodiments.

Generally speaking, one or more embodiments can facilitate allocating power allocations to implementations of different radio access technologies in a user equipment. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., rapidly labeling parts of images based on different criteria), that are not abstract and cannot be performed as a set of mental acts by a human. For example, a human, or even a plurality of humans, cannot efficiently integrate wireless data receipt and demodulation (which generally cannot be performed manually by a human) and detailed analysis of information about a wireless connection, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate controlling network transmission parameters to reduce streaming latency. Different examples that describe these aspects are included with the description of FIGS. 1-10 below. It should be noted that the subject disclosure may be embodied in many different forms and should not be construed as limited to this example or other examples set forth herein.

For example, one or more examples discussed herein concern environments where a user equipment is capable of connecting to a wireless network using more than one RAT, e.g., LTE and NR. In this arrangement, different amounts of available power can be allocated to the hardware of the user equipment for uplink transmissions with respective RATs. One or more embodiments described herein provide different approaches for dynamically adjusting the power allocated to the RATs based on different factors described below.

FIG. 1 is an architecture diagram of an example system 100 that can facilitate allocating available uplink power between two different RATs, in accordance with one or more embodiments. For purposes of brevity, description of like elements and/or processes employed in other embodiments is omitted. It should be noted that, although many examples herein discuss allocating between two different RATs (e.g., LTE and NR), one having skill in the relevant art(s), given the description herein would appreciate that the approaches can also apply to allocating between more than two RATs.

As depicted, system 100 can include controller equipment 150 communicatively coupled to base station 180 via network 190. In one or more embodiments, controller equipment can include computer executable components 120, processor 160, storage device 170, and memory 165. Computer executable components 120 can include performance characteristic identifier 122, user equipment identifier 124, allocation determining component 126, and other components described or suggested by different embodiments described herein that can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, controller equipment 150 can further comprise various computer and/or computing-based elements described herein with reference to operating environment 1000 and FIG. 10.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 170 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining performance characteristic identifier 122. As discussed with FIGS. 2 and 3 below, user equipment identifier 124 can, in accordance with one or more embodiments, identify a user equipment communicatively coupled to base station equipment via a first network connection implementing a first radio access technology and a second network connection implementing a second radio access technology different from the first radio access technology.

In another example, in one or more embodiments, computer executable components 120 can include instructions that, when executed by processor 160, can facilitate performance of operations defining performance characteristic identifier 122. As discussed with FIGS. 2 and 3 below, performance characteristic identifier 122 can, in accordance with one or more embodiments, identify, by the system, a first performance characteristic of the first network connection and a second performance characteristic of the second network connection.

In another example, computer executable components 120 can include instructions that, when executed by processor 160, can facilitate performance of operations defining performance characteristic identifier 122. As discussed herein, performance characteristic identifier 122 can, in accordance with one or more embodiments, based on the first performance characteristic and the second performance characteristic, facilitate allocating, to the user equipment, power for uplink transmission by the first network connection and the second network connection, resulting in an uplink power allocation.

Figure 2:
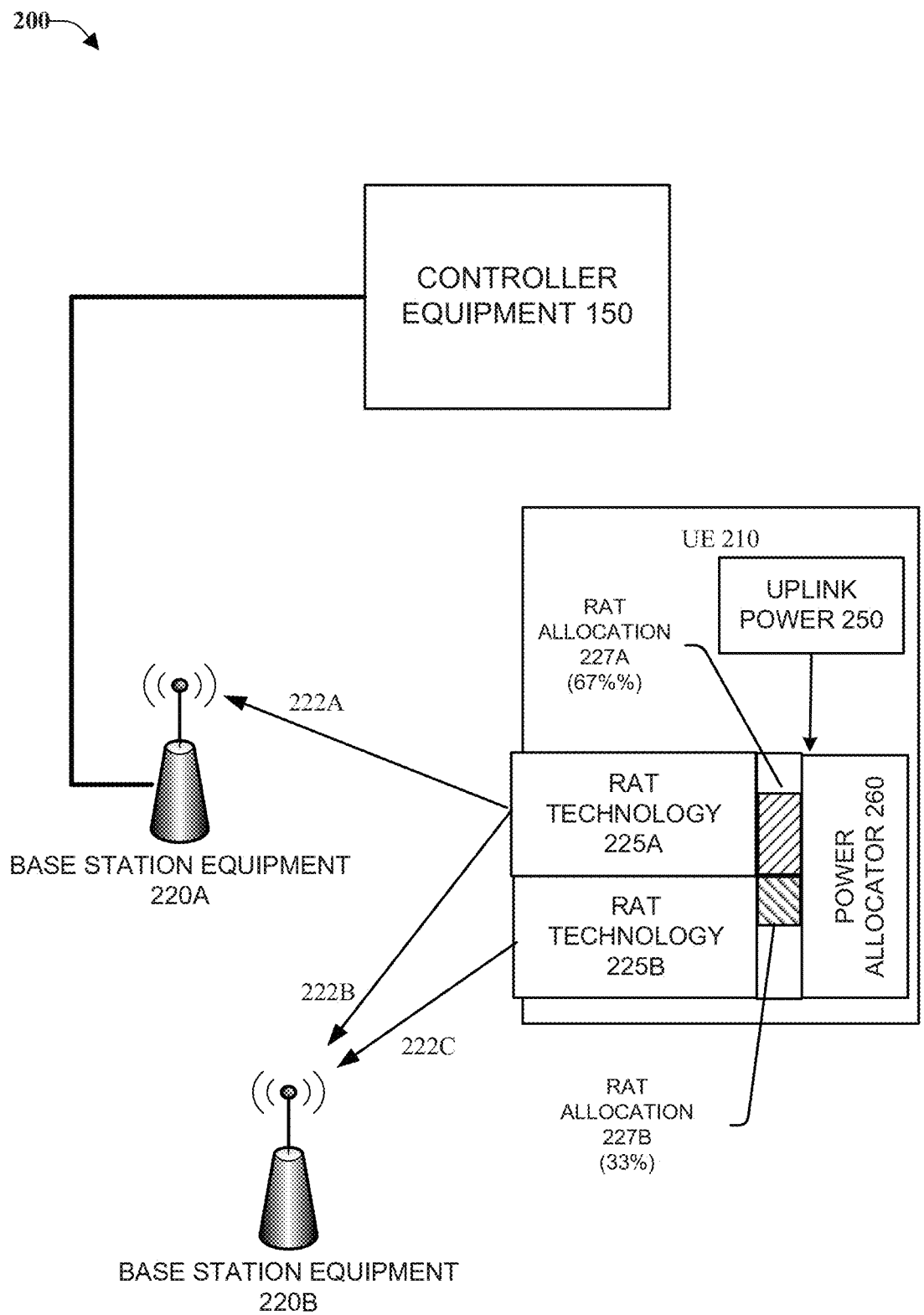
FIG. 2 is a diagram of a non-limiting example system that can facilitate a user equipment connecting to one or more base stations using implementations of more than one RAT, in accordance with one or more embodiments.

FIG. 2 is a diagram of a non-limiting example system 200 that can facilitate a user equipment connecting to one or more base stations using more than one RAT, in accordance with one or more embodiments. For purposes of brevity, description of like elements and/or processes employed in other embodiments is omitted. System 200 can include controller equipment 150, and UE 210 being served by base station equipment 220A-B.

In accordance with one or more embodiments, UE 210 can include hardware that can implement RAT technologies 225A-B, with RAT technology 225A being used to connect to corresponding RAT technology 225A at base station equipment 220A-B, with connections 222A-B respectively. In accordance with one or more embodiments, UE 210 can also include hardware that can implement RAT technology 225B for connection to corresponding RAT technology 225B at base station equipment 220B, with connection 222C. This example illustrates how different RAT technologies 225A-B can be implemented by the same base station, e.g., with base station equipment 220B receiving signals from both In an exemplary example illustrated with FIG. 2, base station equipment 220A-B are part of a 5G deployment that can be implemented with an existing LTE deployment by using a non-standalone option, e.g., dial connectivity in a E-UTRAN new radio mode (EN-DC). One having skill in the relevant art(s), given the description herein would appreciate that other protocols and combinations of RATs can also use different combinations of features discussed herein.

In some implementations of ENDC modem, a master node b (MeNB) can operate on an LTE anchor carrier which is generally in frequency division duplexing (FDD) mode, and the E-UTRA-NR g-node b (en-gNB) can operate on a NR carrier which could be mm-wave or sub-6, either FDD or time division duplexing (TDD) mode depending on the band frequency used. EN-DC capable UEs can achieve a faster combined speed by integrating LTE and NR carriers as with UE 210, but EN-DC mode can require configuration of the uplink side of both carriers. For example, unlike downlink transmission power of base station equipment 220A-B (e.g., eNB/gNB), the uplink transmission power of UE 210 is limited by a configured maximum output power ($P_{max}$), e.g., 23 dBm for a class of EU, with this power being shared by an LTE carrier and an NR carrier.

Returning to the examples of FIG. 2, as further depicted, for UE 210, power allocator 260 can implement a power allocation selected by controller equipment 150. In this example, the power allocation is depicted by RAT allocations 227A-B of 67% and 33% of uplink power 250, respectively. It should be noted that allocated uplink transmission power described herein can affect many aspects of the operation of UE 210, e.g., uplink transmission range, a number of physical resource block (PRBs) that are allocated during the uplink scheduling, the selection of an uplink transmission modulation and coding scheme (MCS) for the uplink, and, resulting from combinations of these factors, the throughput of UE 210. Stated differently, the selection of a mix of transmission powers between the LTE carrier and the NR carrier can determines throughput for the LTE uplink throughput and the NR uplink throughput, especially when UE is at the cell edge of a cell, and uplink transmission power is limited.

Returning to the operation of the example of UE 210, using LTE and NR radio access technologies, in one or more embodiments, performance characteristics of the connections of UE 210 can be used to affect the selection of the uplink allocations described above. In an example, a performance characteristic that can be measured for connections 222A-C can include a signal to interference-plus-noise ratio (SINR) of the signals. For a UE operating in EN-DC mode, performance characteristic can be periodically measured as the average uplink SINR via a demodulation reference signal (DMRS) in a physical uplink shared channel (PUSCH), e.g., denoted herein as $SINR_{LTE\_MEAS}$ and $SINR_{NR\_MEAS}$ respectively. In one or more implementations, the periodicity of these measurements can be related to a channel coherence time (CCT) of UE 210. As used herein, CCT can be a performance characteristic that references a period of time (e.g., 10 ms) where an individual signal or a combination of signals from UE 210 generally remains consistent. As described below, because of this consistency, one or more embodiments can beneficially use the CCT of UE 210 as a periodic cycle for adjusting determined uplink allocations. CCT can be measured by a base station and relayed to controller equipment 150 for use determining the uplink allocation.

Equations illustrating this example are include in FIGS. 3 and 4, and the periodicity of uplink allocation adjustment modifications is depicted in timeline 500 of FIG. 5, discussed below. In one or more embodiments, the LTE and NR channel conditions of UE 210 have different CCT cycles, a cycle with greatest common divisor can be selected.

Figure 3:
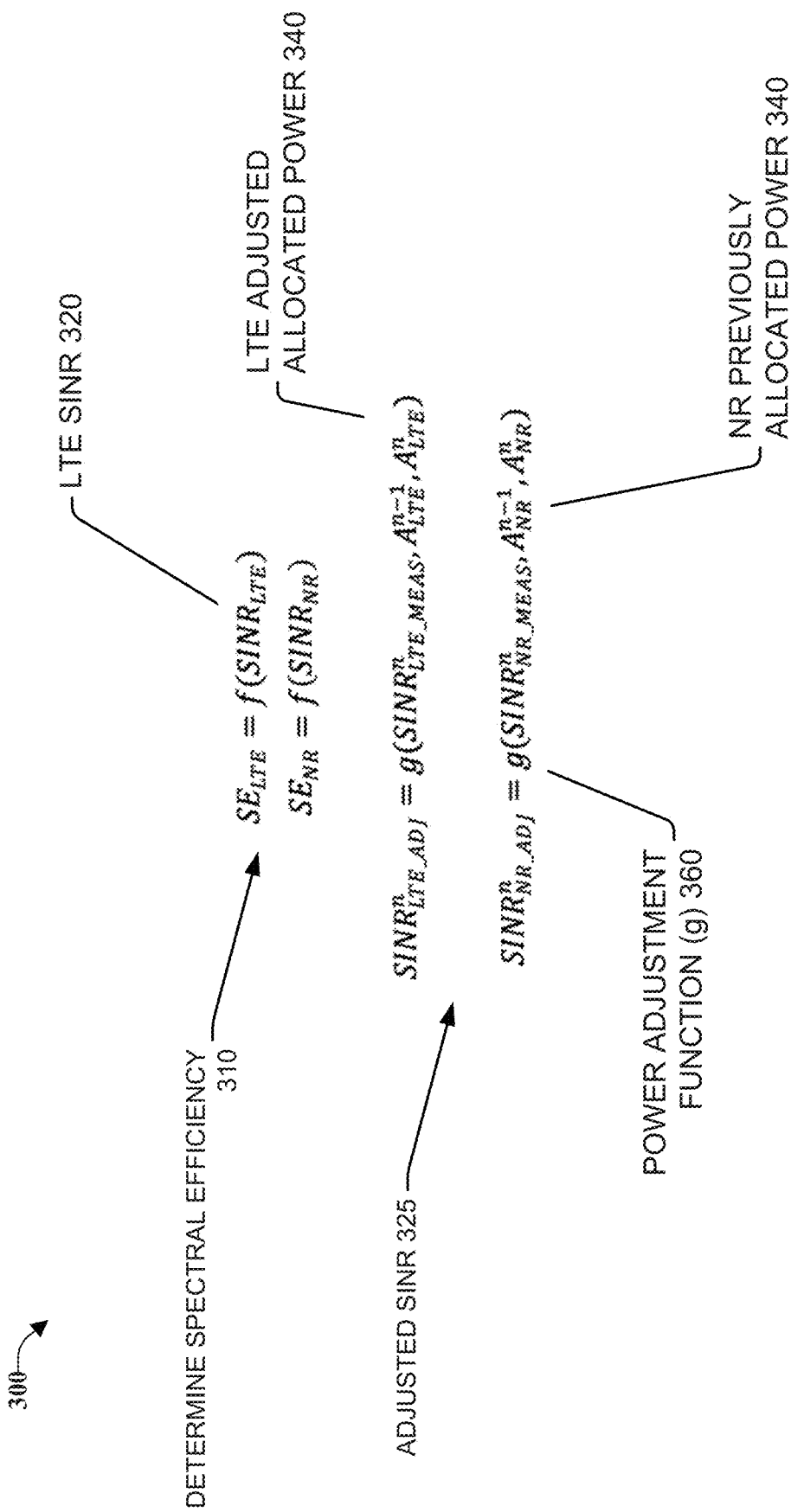
FIGS. 3 and 4 respectively depict example equations that can be employed by one or more embodiments to select the allocation of uplink resources between radio access technologies implemented by a user equipment, in accordance with one or more embodiments.
Figure 4:
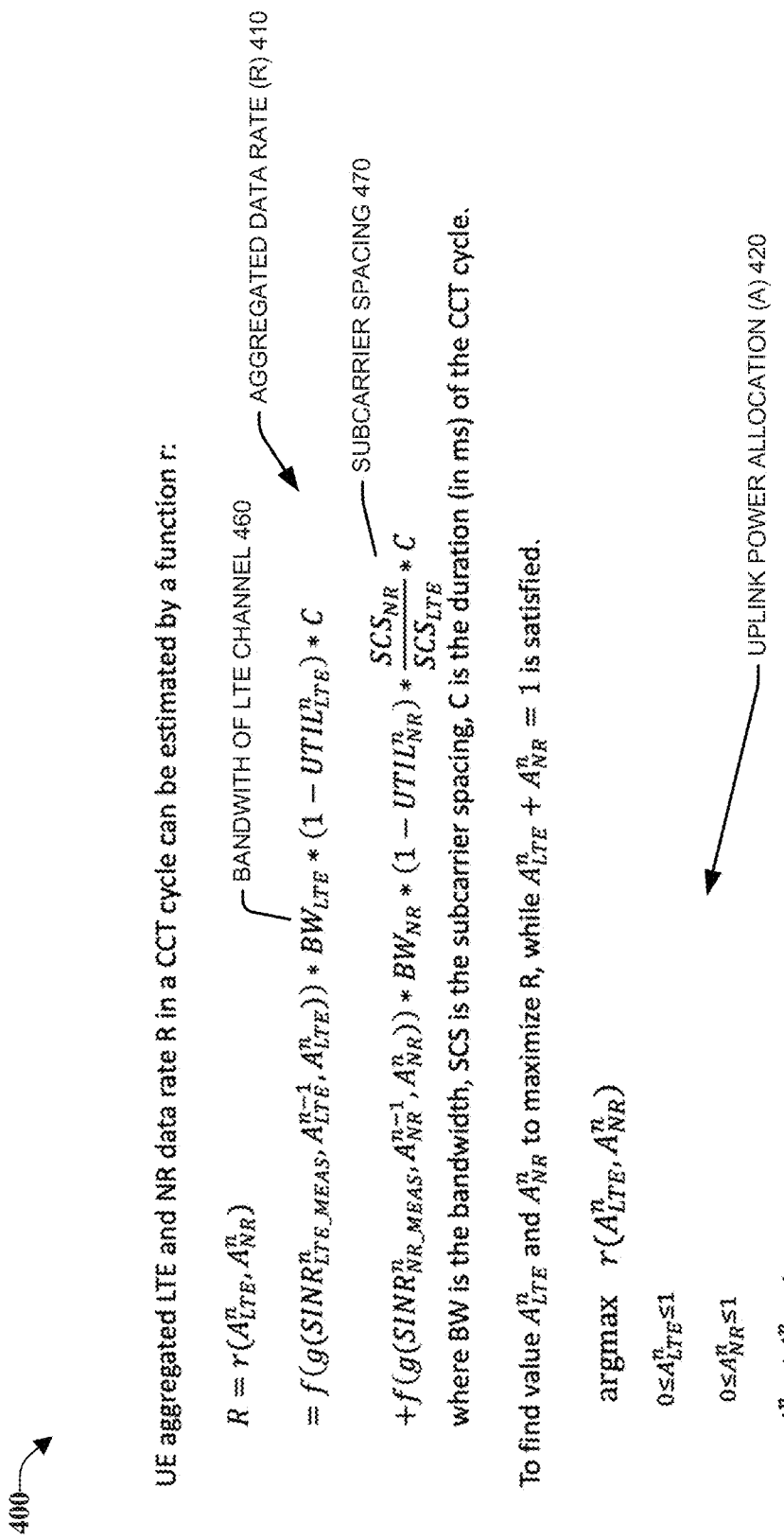

FIGS. 3 and 4 depict example equations that can be employed by one or more embodiments to select the allocation of uplink resources between RATs implemented by a user equipment, in accordance with one or more embodiments.

An additional performance characteristic that can be used by one or more embodiments to affect the selection of the uplink allocation, can include measures of the spectral efficiency 310 of the respective RAT uplink transmissions. As shown in FIG. 3, in one or more embodiments, spectral efficiency 310 can be a function of a SINR characteristic of each of the LTE signal (e.g., LTE SINR 320) and the NR signal (not labeled in FIG. 3). It should be noted that, depending upon implementation specifics, one or more embodiments can determine spectral efficiency 310 by a measured SINR, an adjusted SINR 325 (discussed below), or any other combinations of performance characteristics of one or more uplink channels discussed herein. Another performance characteristic that can be used to select an allocation between RATs is the cell uplink PRB utilization for each RAT uplink, e.g., discussed with FIG. 4 below as $UTIL_{LTE}$ and $UTIL_{NR}$.

It should be noted that, as described further with FIG. 5 below, in one or more embodiments described herein, uplink allocations can be selected for each CCT cycle, with the determination of allocation for an upcoming cycle being based on factors including the uplink allocation of the previous CCT cycle. One way that this incorporation of past allocations can be implemented is by determining adjusted SINR 325, with the equation shown incorporating an example power adjustment function (g) 360. In one or more embodiments, controller equipment 150 can receive the inputs shown from base station equipment 220A, and, using allocation determining component 126, estimate an adjusted SINR based on the measured SINR in the current CCT cycle and the portion of existing allocated uplink transmission power from the previous CCT cycle. As included in this equation, the uplink power limited situation is reflected, e.g., $A_{LTE}+A_{NR}=1$, and (n) denotes the nth CCT cycle.

Continuing this example selection of the uplink power allocation, FIG. 4 depicts additional example equations that can be used with one or more embodiments. As noted above, one of the significant results of the allocation of uplink power between RATs is the throughput of each channel, and the overall throughput of UE 210. Based on this, in this example, allocation determining component 126 of controller equipment 150 can receive inputs corresponding to the performance characteristics discussed above (e.g., SINR, and utilizations) and dynamically allocate the uplink transmission power between the LTE carrier and the NR carrier so as to attempt to maximize the aggregated data rate (R) 410 for the uplink from UE 210.

Figure 6:
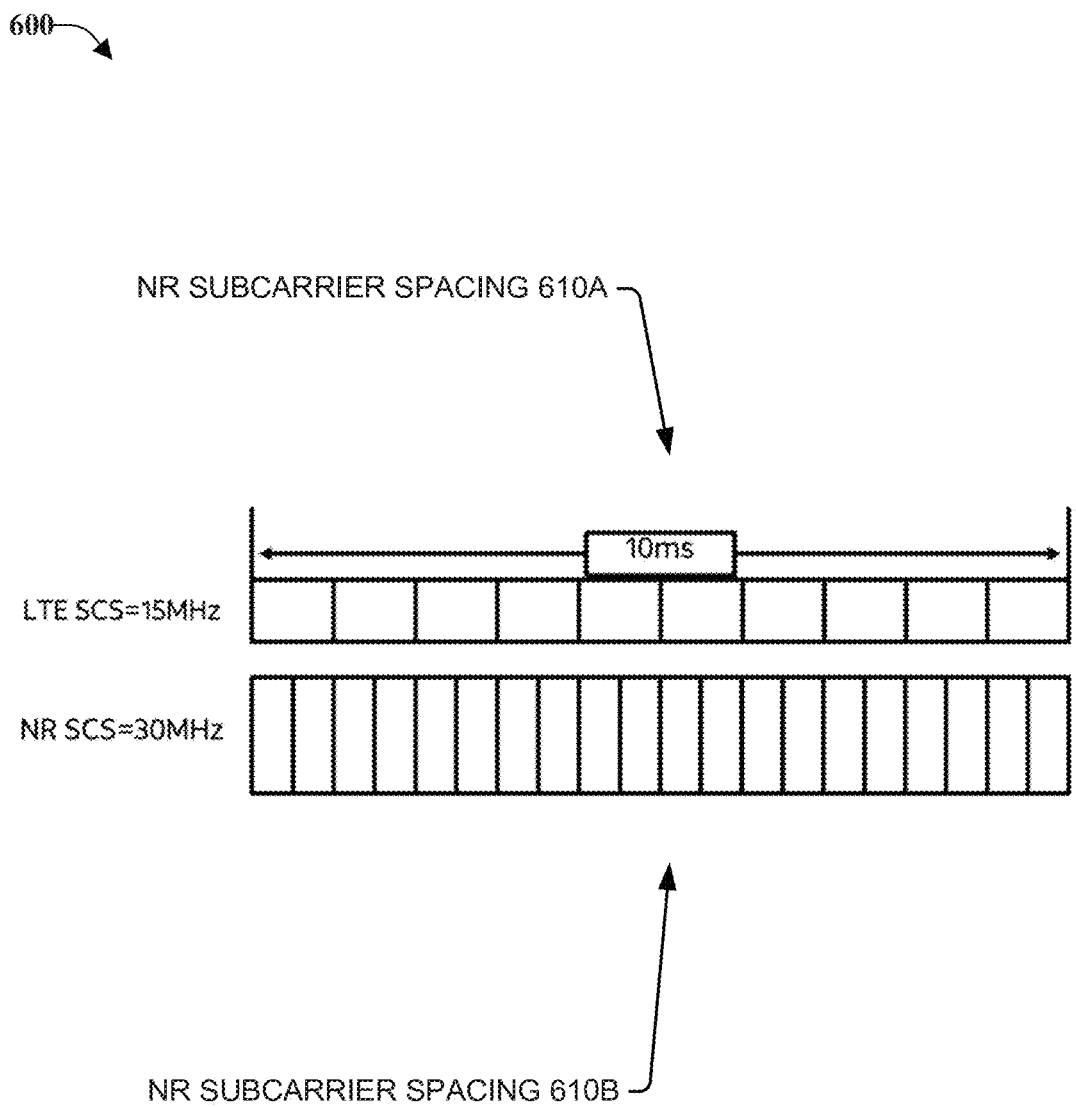
FIG. 6 depicts an example of subcarrier spacing used by implementations of two different radio access technologies, in accordance with one or more embodiments.

One aspect of the equations of FIG. 4 that is discussed further below with FIG. 6 is subcarrier spacing (SCS) 470. As included in the example equation for aggregated data rate (R) 410, the ratio of the NR SCS to the LTE SCS, along with the bandwidth of the respective channels (e.g., bandwidth of LTE channel 460), the duration of the CCT cycle (C) can affect the determination of uplink power allocation (A) 420.

Figure 5:
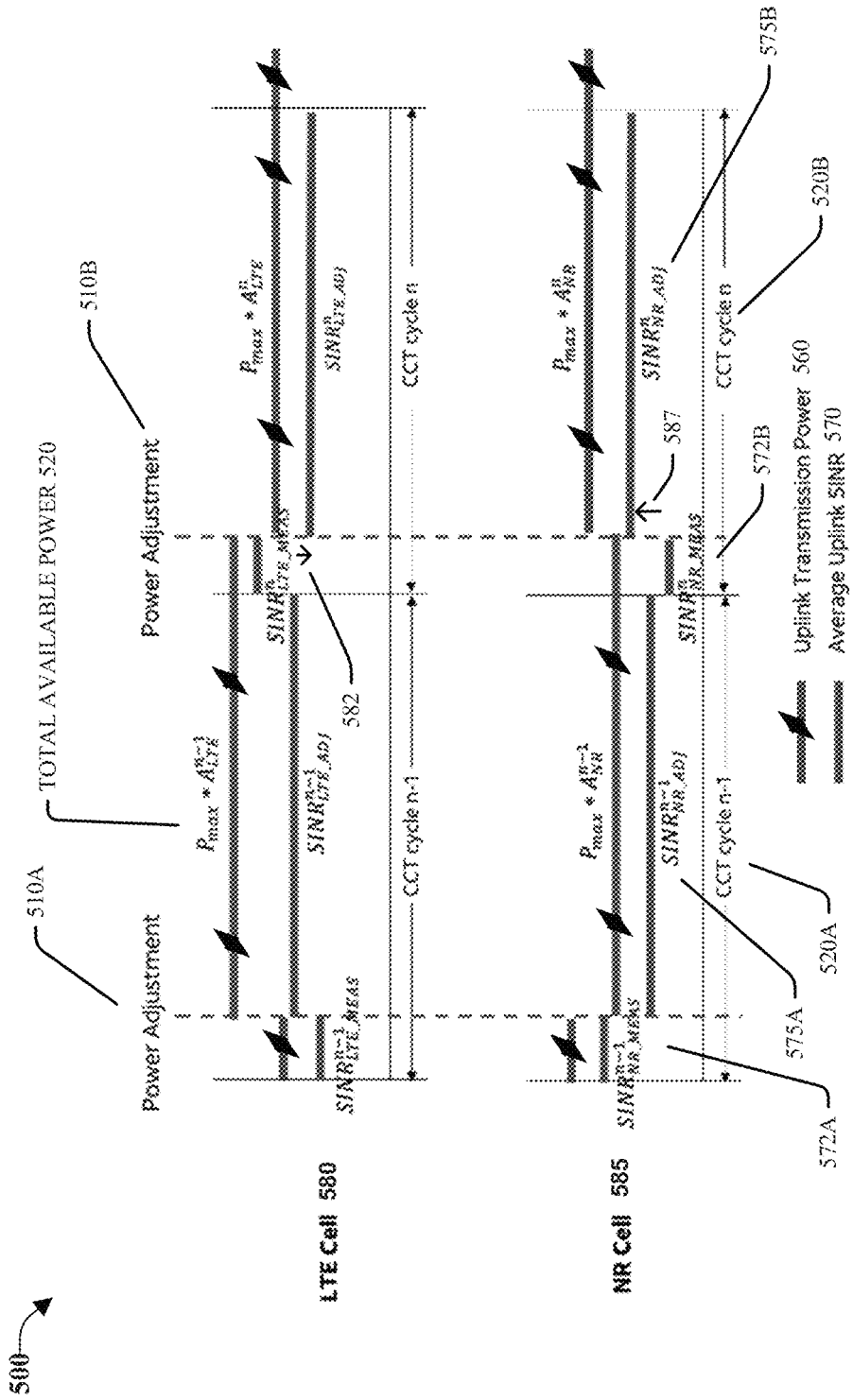
FIG. 5 depicts an example timeline of measured performance characteristics and power adjustments to improve performance, in accordance with one or more embodiments.

FIG. 5 depicts an example timeline 500 of measured performance characteristics and power adjustments to improve performance, in accordance with one or more embodiments. For purposes of brevity, description of like elements and/or processes employed in other embodiments is omitted.

Timeline 500 includes sections for LTE cell 580 carrier and NR cell 585 carrier, along with CCT cycles 520A-B for UE 210 with levels shown for uplink transmission power 560 and the performance characteristic (average uplink SINR 570) measured for each carrier. At the beginning of the labeled CCT cycles 520A-B, power adjustments 510A-B are made based on average uplink SINR 570 and uplink transmission power 560 of the previous cycle, e.g., n−1. Average uplink SINR 570 depicted is a combination of measured SINR 572A-B and, as discussed with FIG. 3 above, adjusted SINR 575A-B.

At timeline feature to be noted as illustrating an improvement in channel optimization based on a power adjustment to LTE cell 580 and NR cell 585, decreased SINR 582 references a decrease in SINR for LTE cell 580 based on power adjustment 510B, and increased SINR 587 references an increase in SINR for NR cell 585 based on the same adjustment. In this example, a decrease in power to LTE cell 580 led to a detrimental change to signal quality, but a corresponding increase in power to NR cell 585 led to a larger improvement in the signal quality to NR cell 585. As would be appreciated by one having skill in the relevant art(s), given the description herein, many different factors can be considered when assessing the benefit of a power adjustment, e.g., the increased capacity of an NR signal making improvements to this signal potentially more valuable than similar improvements to an LTE signal.

FIG. 6 depicts an example 600 of SCS 610A-B for LTE cell 580 and NR cell 585, in accordance with one or more embodiments. For purposes of brevity, description of like elements and/or processes employed in other embodiments is omitted.

In this example, the differences between SCS for LTE (e.g., 15 Mhz) and NR (e.g., 30 Mhz) are depicted for an implementation of these two RATs. As with other characteristics of the signals from the respective RATs, SCS can be considered for power allocations because this characteristic can affect the throughput of a signal, given a particular signal quality.

Figure 7:
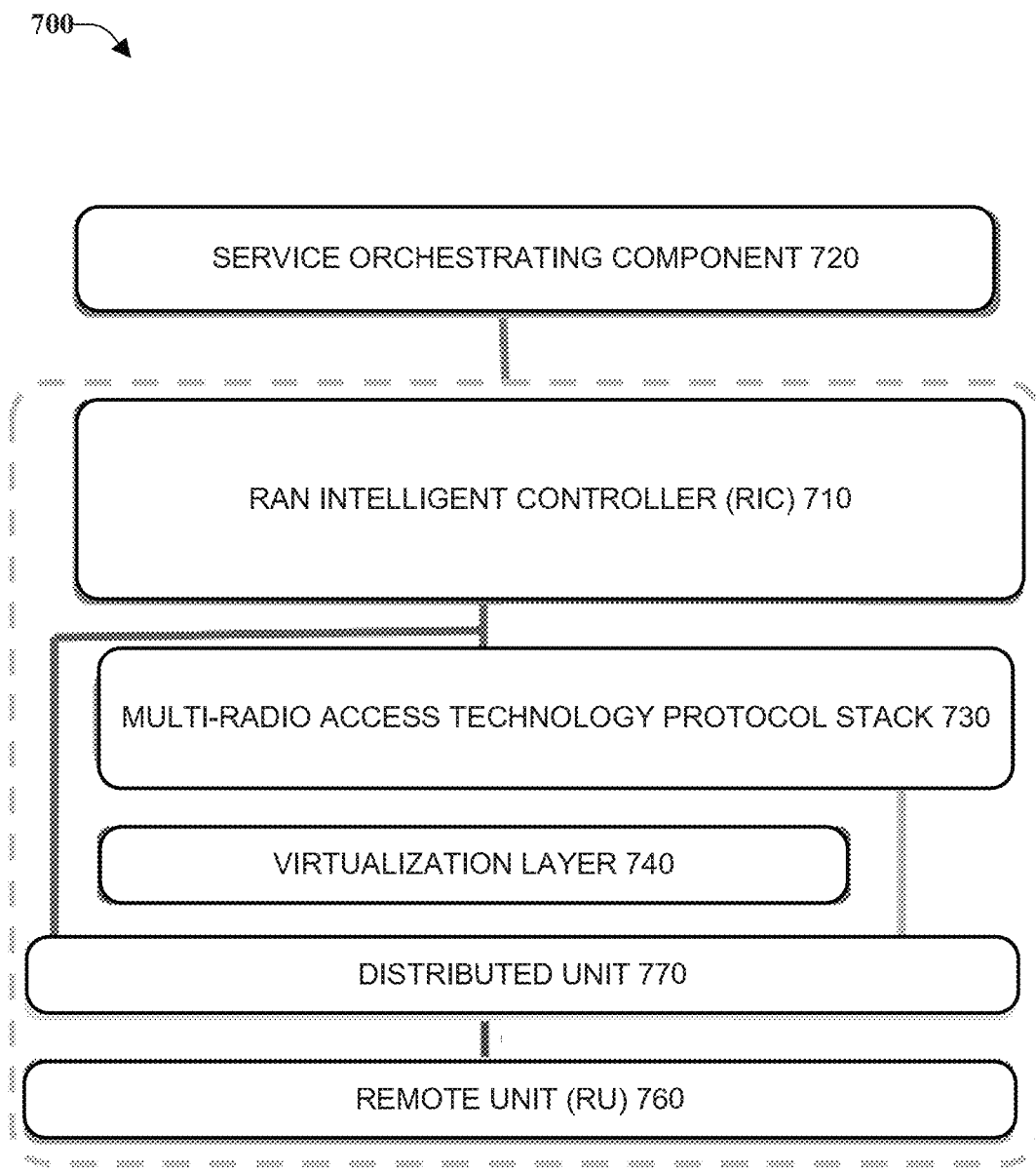
FIG. 7 depicts a system where one or more functions of controller equipment can be implemented, in accordance with one or more embodiments described above.

FIG. 7 depicts a system 700 where one or more functions of controller equipment 150 described above can be implemented, in accordance with one or more embodiments described above. For purposes of brevity, description of like elements and/or processes employed in other embodiments is omitted. In one or more embodiments, controller equipment 150 can be implemented in a software platform that includes several interconnected components. As depicted, system 700 includes, RAN intelligent controller (RIC) 710, multi-radio access tech. protocol stack 730, virtualization layer 740, remote unit (RU) 760, and distributed unit (DU) 770.

In an example, RIC 710 can include the functions of controller component 150, supported by the other layers of system 700. For example, different components facilitating different RATs can controlled using multi-radio access tech. protocol stack 730 and different virtualized components can be implemented with virtualization layer 740. In addition, as depicted, different elements of open RAN architectures can be served by different functions provided by controller component 150, e.g., DU 770 and RU 760.

As noted above, RIC 710 can receive the performance characteristics of the uplink signals of the two RATs and utilize approaches similar to those depicted in FIGS. 3-6 to select a power allocation for the RATs. Once the power allocation is selected, RIC 710 can facilitate the allocation being used to set the power for UE 210 by relaying the selected allocation to base station equipment 220B, and having the base station relay the allocation to UE 210.

Figure 8:
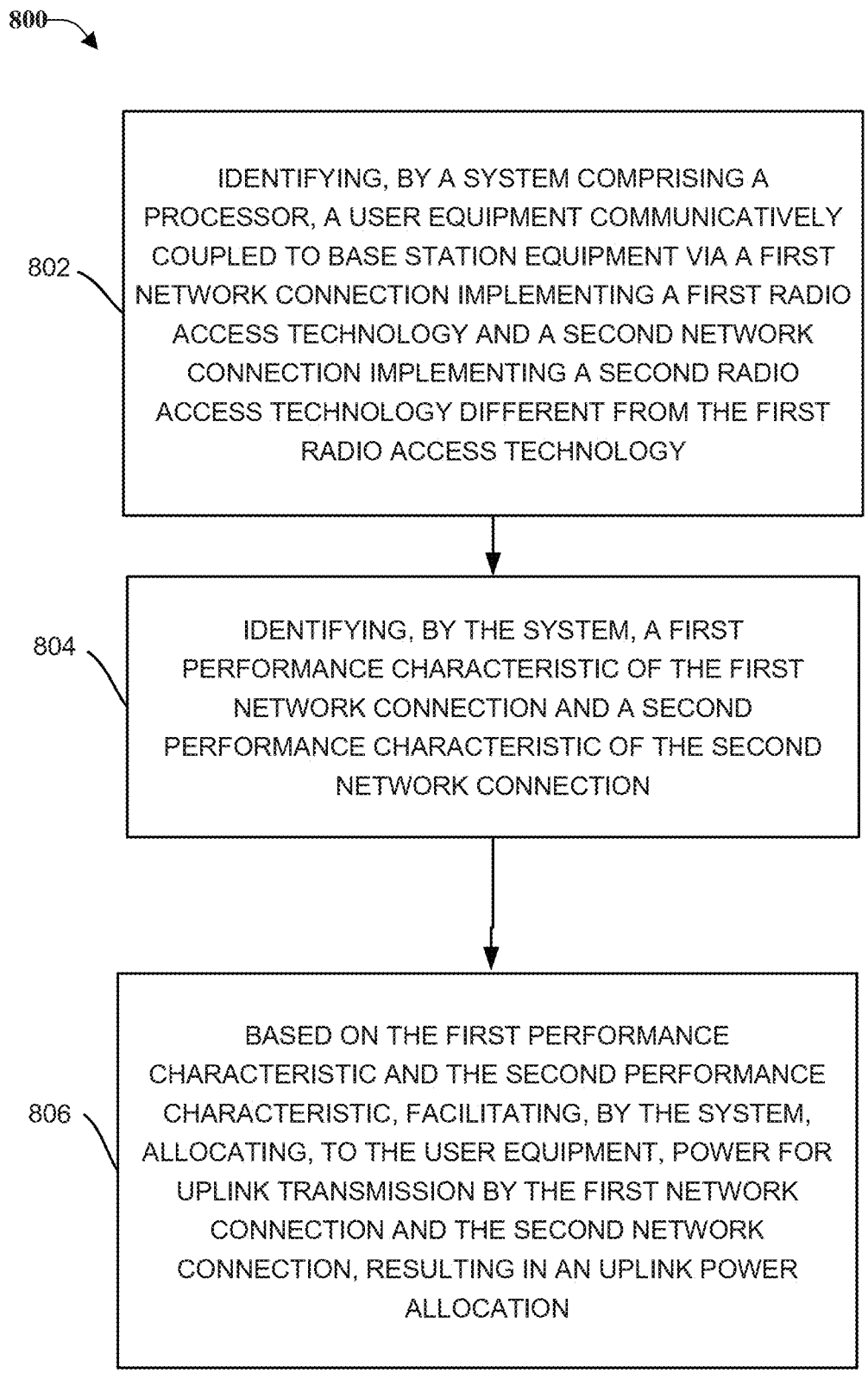
FIG. 8 illustrates an example method that can facilitate allocating power allocations to implementations of different radio access technologies, in accordance with one or more embodiments.

FIG. 8 illustrates an example method 800 that can facilitate allocating power allocations to implementations of different RATs, in accordance with one or more embodiments. For purposes of brevity, description of like elements and/or processes employed in other embodiments is omitted.

At 802, method 800 can include, identifying, by a system comprising a processor, a user equipment communicatively coupled to base station equipment via a first network connection implementing a first radio access technology and a second network connection implementing a second radio access technology different from the first radio access technology. For example, in one or more embodiments, method 800 can include, identifying, by user equipment identifier 124 of controller equipment 150, user equipment 210 communicatively coupled to base station equipment 220A via a first network connection 222A implementing a first radio access technology 225A and a second network connection 222B implementing a second radio access technology 225B different from the first radio access technology.

At 804, method 800 can further include identifying, by the system, a first performance characteristic of the first network connection and a second performance characteristic of the second network connection. For example, in one or more embodiments, method 800 can include, identifying, by performance characteristic identifier 122, a SINR performance characteristic of the network connection 222A and a SINR performance characteristic of second network connection 222B, with these characteristics being measured by base station equipment 220B and relayed to controller equipment 150 for analysis.

At 806, method 800 can further include, based on the first performance characteristic and the second performance characteristic, facilitating, by the system, allocating, to the user equipment, power for uplink transmission by the first network connection and the second network connection, resulting in an uplink power allocation. For example, in one or more embodiments, method 800 can include, facilitating allocating, to user equipment 210, RAT allocations 227A-B (e.g., determined by allocation determining component 126) for uplink transmission by the network connection 222B and the network connection 222C, resulting in an uplink power allocation. The allocations can be relayed to base station equipment 220B for relay to UE 210, where power allocator 260 can utilize the allocations for RATs 225A-B.

Figure 9:
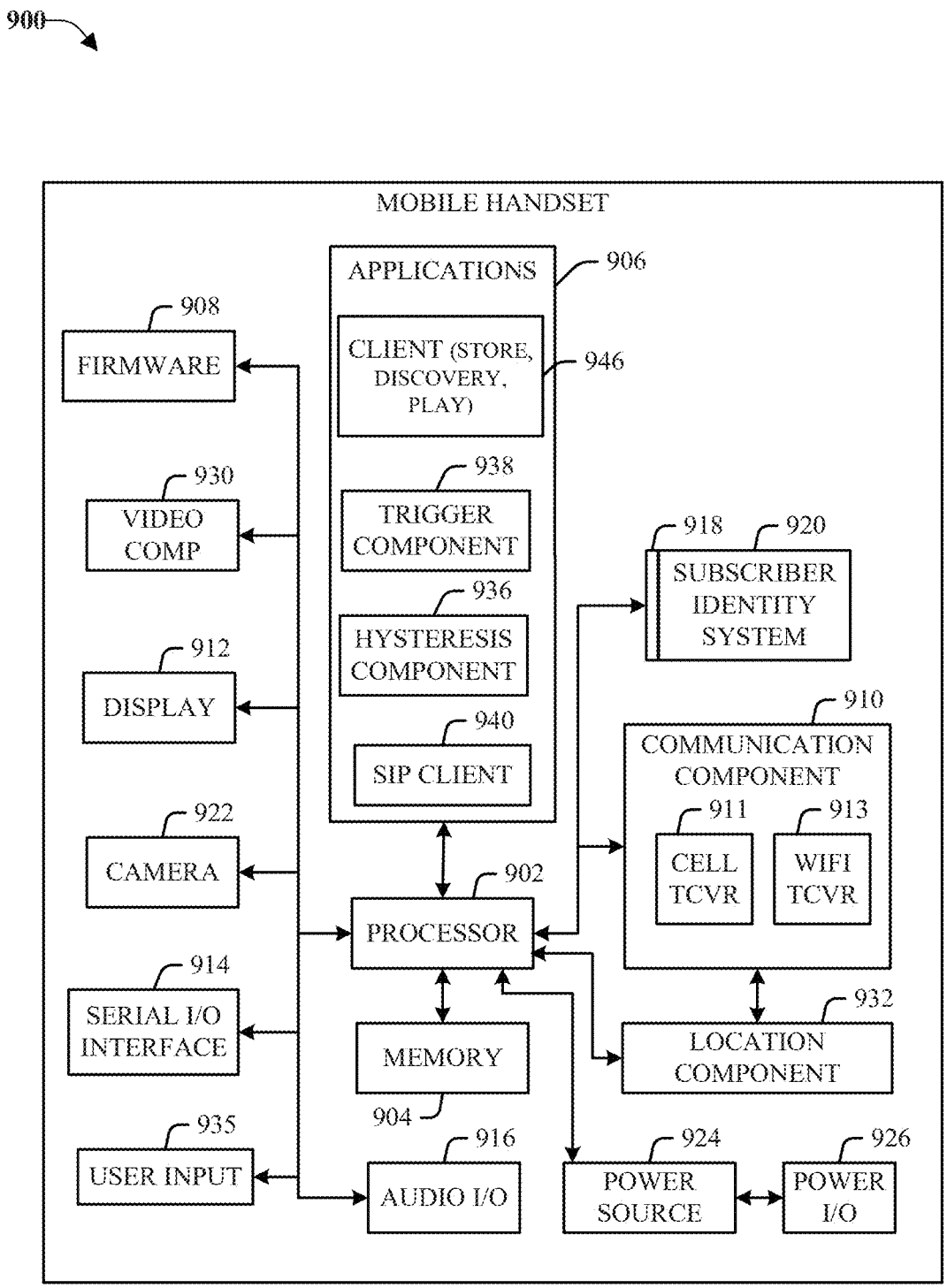
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
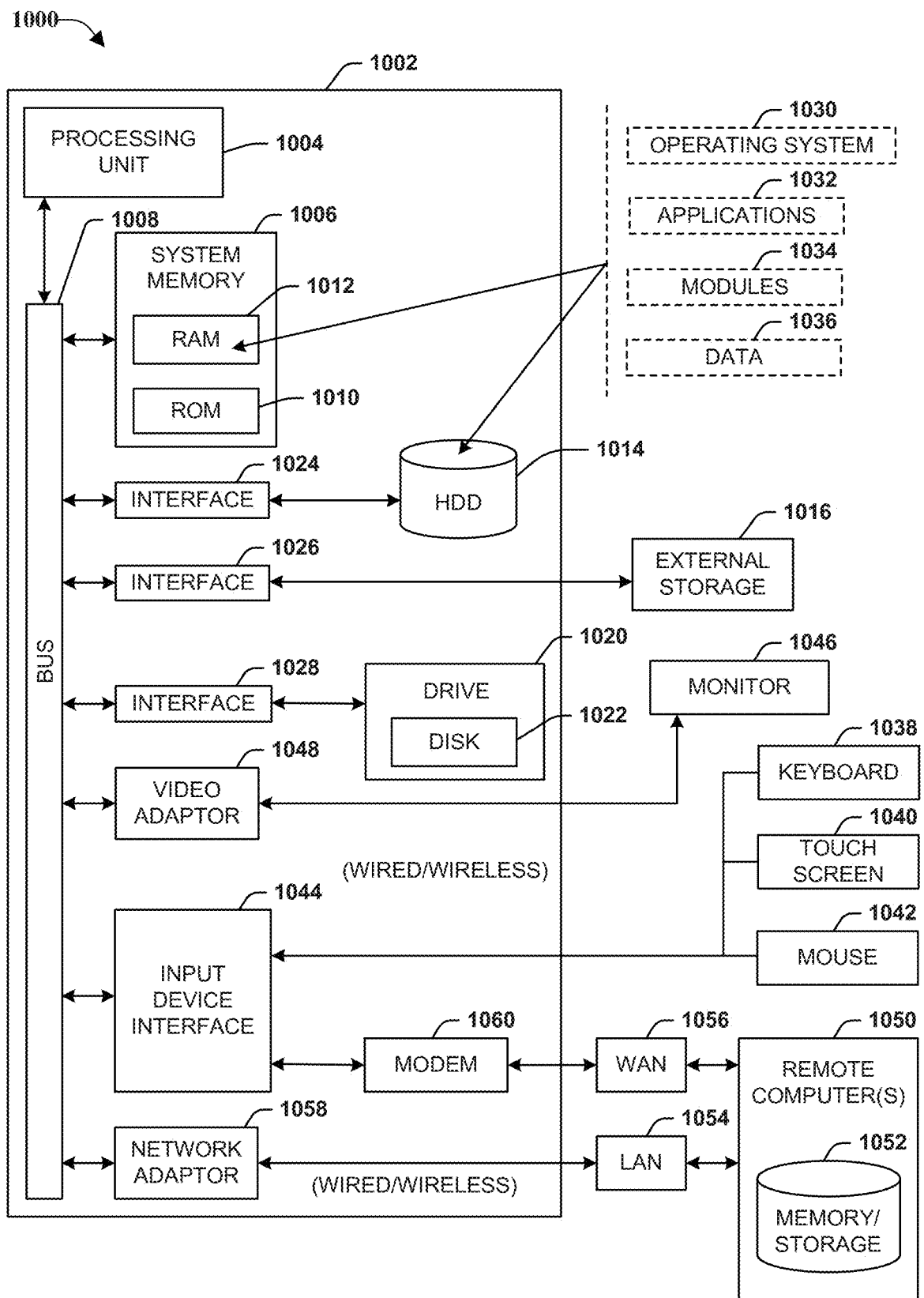
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   identifying, by a system comprising a processor, a user equipment communicatively coupled to base station equipment via a first network connection implementing a first radio access technology and a second network connection implementing a second radio access technology different from the first radio access technology;
   identifying, by the system, a first performance characteristic of the first network connection and a second performance characteristic of the second network connection; and
   based on an analysis by the system of the first performance characteristic and the second performance characteristic, facilitating, by the system, sending, to the user equipment, an indication to change a first power for first uplink transmission by the first network connection and a second power for second uplink transmission by the second network connection, resulting in an uplink power allocation, wherein uplink power allocation allocates the first power and the second power from a total power able to be provided by a power source for the first uplink transmission and the second uplink transmission.

2. The method of claim 1, wherein implementing the first radio access technology comprises implementing a fifth generation communication network protocol.

3. The method of claim 1, wherein the analysis comprises determining the uplink power allocation based on a value corresponding to a bandwidth of the first network connection.

4. The method of claim 1, wherein the analysis comprises determining the uplink power allocation based on a value corresponding to a subcarrier spacing of the first network connection.

5. The method of claim 1, wherein the first performance characteristic comprises a duration of a channel coherence cycle of the first network connection.

6. The method of claim 5, wherein the analysis comprises determining a present allocation for an upcoming channel coherence cycle, and wherein the present allocation is allocated based on a past allocation of a previous channel coherence cycle prior to the upcoming channel coherence cycle.

7. The method of claim 6, wherein the analysis is based on a function with variables comprising a first variable representative of the past allocation, a second variable representative of the first performance characteristic and a third variable representative of the second performance characteristic.

8. The method of claim 1, wherein the first performance characteristic comprises a first ratio of signal to interference plus noise of the first network connection.

9. The method of claim 8, further comprising, based on the first ratio, estimating, by the system, a spectral efficiency of the first network connection, resulting in an estimated spectral efficiency, wherein the first performance characteristic further comprises the estimated spectral efficiency.

10. The method of claim 1, wherein the first performance characteristic comprises a cell uplink utilization of the first network connection.

11. The method of claim 1, wherein the analysis comprises determining the uplink power allocation based on the uplink power allocation that was established at a time that the first performance characteristic was measured.

12. The method of claim 1, wherein facilitating the sending comprises communicating the indication to the base station equipment.

13. The method of claim 1, wherein the analysis is based on a selected aggregated data rate, for the first network connection and the second network connection, that has been estimated to result from the uplink power allocation.

14. A user equipment, comprising:
   a processor; and
   a memory that stores executable instructions that, when executed by the processor, facilitate performance of operations, comprising:
      establishing, with base station equipment,
         a first network connection using a first radio access technology and
         a second network connection using a second radio access technology different from the first radio access technology,
      wherein first power for the first network connection and second power for the second network connection are controlled by a first power allocation,
      wherein the first power and the second power are allocated from a total power able to be provided by a power source for uplink transmission; and
      receiving, from the base station equipment, an indication to change control from the first power allocation to a second power allocation, wherein the indication was generated by network controller equipment based on an analysis of a first performance characteristic of the first network connection and a second performance characteristic of the second network connection.

15. The user equipment of claim 14, wherein the first performance characteristic has been:
   measured by the user equipment, and
   communicated to the network controller equipment for a determination of the second power allocation.

16. The user equipment of claim 15, wherein the first performance characteristic comprises a ratio of signal to noise associated with the first network connection.

17. A non-transitory machine-readable medium, comprising executable instructions that, when executed by a processor of a system, facilitate performance of operations, comprising:

identifying a user equipment communicatively coupled to base station equipment via a first network connection that communicates according to a first radio access protocol and a second network connection that communicates according to a second radio access protocol different from the first radio access protocol;

identifying a measure of quality of the first network connection and the second network connection; and based on the measure of quality and a selected aggregated data rate for the user equipment that aggregates at least a first data rate associated with the first network connection and a second data rate associated with the second network connection, determining an allocation a first portion of an amount of power for uplink transmission by the first network connection and a second portion of the amount of power for uplink transmission by the second network connection, wherein the amount of power comprises power available for consumption by the user equipment.

18. The non-transitory machine-readable medium of claim 17, wherein the measure of quality comprises a signal to noise ratio measured by the base station equipment.

19. The non-transitory machine-readable medium of claim 17, wherein the measure of quality comprises a cell uplink utilization associated with first network connection.

20. The non-transitory machine-readable medium of claim 17, wherein the determining of the allocation is further based on a previous allocation applicable to the first network connection and the second network connection at a time when the measure of quality was measured.

* * * * *